US010725522B2

(12) United States Patent
Tazebay et al.

(10) Patent No.: US 10,725,522 B2
(45) Date of Patent: Jul. 28, 2020

(54) NETWORK ENERGY CONSUMPTION REDUCTION

(71) Applicant: AVAGO TECHNOLOGIES INTERNATIONAL SALES PTE. LIMITED, Singapore (SG)

(72) Inventors: Mehmet Vakif Tazebay, Irvine, CA (US); Ahmad Chini, Mission Viejo, CA (US); Xiaotong Lin, Saratoga, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 16/202,957

(22) Filed: Nov. 28, 2018

(65) Prior Publication Data

US 2019/0094940 A1    Mar. 28, 2019

Related U.S. Application Data

(63) Continuation of application No. 14/679,232, filed on Apr. 6, 2015, now Pat. No. 10,156,885.

(60) Provisional application No. 61/976,468, filed on Apr. 7, 2014.

(51) Int. Cl.
*G06F 1/32* (2019.01)
*G06F 1/3209* (2019.01)
*H04L 12/12* (2006.01)

(52) U.S. Cl.
CPC ............ *G06F 1/3209* (2013.01); *H04L 12/12* (2013.01); *Y02D 50/40* (2018.01)

(58) Field of Classification Search
None
See application file for complete search history.

(56) References Cited

U.S. PATENT DOCUMENTS

| 6,697,383 | B1 | 2/2004 | Li et al. |
| 7,881,344 | B2 | 2/2011 | Suzuki et al. |
| 2007/0153705 | A1 | 7/2007 | Rosar et al. |
| 2010/0262848 | A1 | 10/2010 | Bobrek et al. |
| 2012/0021054 | A1 | 1/2012 | Lum et al. |
| 2012/0051241 | A1 | 3/2012 | Mori et al. |
| 2012/0210154 | A1 | 8/2012 | Hartwich |
| 2013/0232257 | A1 | 9/2013 | Mukai et al. |

(Continued)

FOREIGN PATENT DOCUMENTS

| CN | 101106569 A | 1/2008 |
| CN | 101123561 A | 2/2008 |

(Continued)

OTHER PUBLICATIONS

Non-Final Office Action in U.S. Appl. No. 14/679,232, dated Oct. 25, 2016, 10 pages.

(Continued)

*Primary Examiner* — Paul B Yanchus, III
(74) *Attorney, Agent, or Firm* — Foley & Lardner LLP

(57) ABSTRACT

In some aspects, the disclosure is directed to methods and systems for a device including a physical interface with electrical connection to a communication channel, and circuitry configured to detect energy received at the physical interface, wait a predetermined length of a time until the beginning of a time slot, monitor the physical interface during the time slot for a predefined pattern from the communication channel, and upon detection of the predefined pattern, transition the device to an increased-power mode.

20 Claims, 6 Drawing Sheets

(56) References Cited

U.S. PATENT DOCUMENTS

2013/0318380 A1  11/2013  Behrens et al.
2014/0149758 A1   5/2014  Rajkotia
2014/0173307 A1   6/2014  Machnicki et al.

FOREIGN PATENT DOCUMENTS

CN  101973235 A  2/2011
CN  102158257    8/2011
CN  102420795 A  4/2012

OTHER PUBLICATIONS

Final Office Action in U.S. Appl. No. 14/679,232, dated May 18, 2017, 13 pages.
Non-Final Office Action in U.S. Appl. No. 14/679,232, dated Nov. 2, 2017, 11 pages.
First Office Action in CN 201510162096.6, dated Feb. 2, 2018, 16 pages (with machine translation into English).
Office Action in DE102015004488.5, dated Jun. 14, 2018, 8 pages (with English language summary).
Final Office Action in U.S. Appl. No. 14/679,232, dated May 18, 2018, 11 pages.
Notice of Allowance in U.S. Appl. No. 14/679,232, dated Aug. 8, 2018, 5 pages.
Third Chinese Action on CN 201510162096.6 dated Mar. 11, 2020 (5 pages).

NETWORK ENERGY CONSUMPTION REDUCTION

CROSS-REFERENCE TO RELATED PATENT APPLICATIONS

This application is a continuation of and claims priority to and the benefit of U.S. patent application Ser. No. 14/679,232, filed Apr. 6, 2015, which claims the benefit of and priority to U.S. Provisional Patent Application 61/976,468, filed Apr. 7, 2014, the contents of which are hereby incorporated herein by reference in their entirety for all purposes.

FIELD OF THE DISCLOSURE

This disclosure generally relates to reduction of energy consumption in network applications, including but not limited to automotive network applications.

BACKGROUND OF THE DISCLOSURE

Reduction of energy consumption is a goal for many network applications. A competing goal is quick response time.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1A:
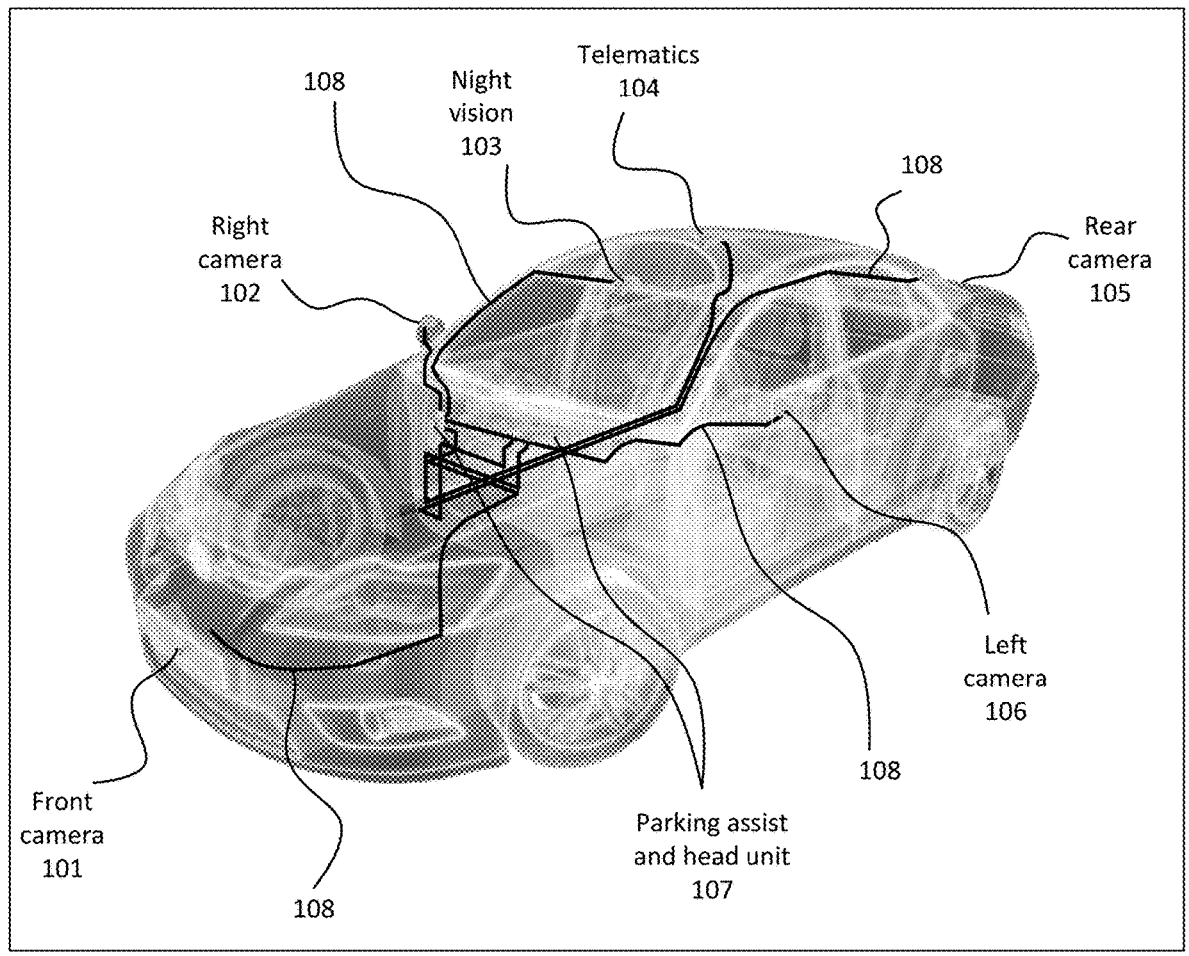
FIG. 1A is a representation of an example of an automotive communication networks.

Various embodiments are discussed in detail below. While specific implementations are discussed, it should be understood that this is done for illustration purposes only. A person skilled in the relevant art will recognize that other components and configurations can be used without parting from the spirit and scope of the present disclosure.

Communication networks are used in ubiquitous applications. Some of these applications are implemented in energy-conscious environments; some of these applications are implemented in response-time-conscious environments; some of these applications are implemented in environments that are both energy-conscious and response-time-conscious, which leads to conflicting goals. For example, in an energy-conscious environment, devices or functions not presently in use can be put into a reduced-power mode; however, coming out of a reduced-power mode can take more time than would be allowed by the response-time-conscious environment.

Power modes include but are not limited to full power, partial sleep, sleep, deep sleep, and off modes. A reduced-power mode in this context indicates a transition of a node, function, device, or electronics module from a first power mode to a second power mode, where less power is consumed by the respective node, function, device, or electronics module in the second power mode. An increased-power mode in this context indicates a transition of a node, function, device, or electronics module from a first power mode to a second power mode, where more power is consumed by the respective node, function, device, or electronics module in the second power mode. Thus, for example, a reference to a transition of an electronics module to an increased-power mode indicates that a node, function, or device in the electronics module, or the electronics module itself, transitions to the increased-power mode. Similarly, for example, a reference to a transition of an electronics module to a decreased-power mode indicates that a node, function, or device in the electronics module, or the electronics module itself, transitions to the decreased-power mode. A transition between power modes is a transition between two consecutive power modes (e.g., deep sleep and sleep, or full power and partial sleep) or a transition between power modes is a transition between two non-consecutive power modes (e.g., partial sleep to off, or sleep to full power).

Described in the present application is a technique suitable for energy-conscious and response-time-conscious environments, as well as environments that are both energy-conscious and response-time-conscious.

One such combined environment, described by way of non-limiting example, is a communication network in an automotive environment. Such a network allows for communication between various functions in different electronics modules. In one or more embodiments, and by way of example, an automotive network includes communication between navigation, telematics, camera, entertainment (e.g., television, radio, CD, and DVD, and including rearseat entertainment (RSE)), and other functions. User-facing functions such as these benefit from improved response-time, as improved response-time provides for an improved experience for the user, in one or more embodiments. However, these and other user-facing functions expend energy even when not in use. In an automotive environment, energy efficiency is prized. In an electric vehicle, for example, energy efficiency is especially prized. Unused functions are often transitioned to a reduced-power mode to reduce energy consumption; however, as noted above, coming out of a reduced-power mode takes time in one or more embodiments, the time possibly exceeding user expectations, thereby potentially degrading the user experience. Thus, in one or more embodiments of this example automotive network, there are competing goals of improved response time and energy efficiency.

One network considered for use in an automotive environment is high speed Ethernet. In one or more embodiments, an implementation of high speed Ethernet over unshielded twisted pair (UTP) cables is of interest due to a relative cost-effectiveness of UTP as well as its longevity in harsh environments such as automotive environments. Because UTP is unshielded, electrical noise is present in the cables (e.g., electromagnetic interference, cross-talk, and other electrical noise) in one or more embodiments.

The techniques described in this disclosure address the competing goals of improved response-time and energy-efficiency in a communication network, while taking into consideration that one or more implementations is in an electrically noisy environment.

In one aspect, a device includes a physical interface configured for electrical connection to a communication channel, and circuitry configured to detect energy received at the physical interface, wait a predetermined length of a time until a beginning of a time slot, monitor the physical interface during the time slot for a predefined pattern from the communication channel, and upon detection of the predefined pattern, transition the device to an increased-power mode.

In one or more embodiments, the detected energy received at the physical interface is random energy.

In one or more embodiments, the device further includes a passive energy detector configured to detect the energy received at the physical interface. In one or more embodiments, the detected energy received at the physical interface includes a pattern.

In one or more embodiments, the device further includes a pattern detector configured to detect the energy received at the physical interface and the predefined pattern.

In one or more embodiments, the device further includes a passive energy detector configured to detect the energy received at the physical interface, and a pattern detector configured to detect the predefined pattern. In one or more embodiments, the circuitry is further configured to activate the pattern detector upon detecting the energy received at the physical interface.

In one or more embodiments, to monitor the physical interface during the time slot for a predefined pattern includes to send an acknowledgment through the physical interface upon detection of the predefined pattern.

In one or more embodiments, the time slot is a number n of time slots, wherein the predefined pattern is divided into pattern portions distributed within corresponding ones of the number n of time slots, and wherein to monitor the physical interface during the time slot for the predefined pattern includes to monitor the physical interface during the n time slots for the corresponding pattern portions distributed in the n time slots.

In one or more embodiments, to monitor the physical interface during the time slot for a predefined pattern includes to send an acknowledgment through the physical interface upon detection of one of the pattern portions.

In an aspect, a method includes detecting energy received at a physical interface device (PHY) from a communication channel, waiting a predefined length of time to a beginning of a time slot, initiating pattern detection, and comparing a pattern detected at the PHY during the time slot to an expected pattern for the time slot. The method further includes, in the case where the detected pattern is equal to the expected pattern, waking up the PHY, and in the case where the detected pattern and the expected pattern are unequal, transitioning to a reduced-power mode.

In one or more embodiments, detecting the energy received at the PHY includes comparing the energy to an expected pattern.

In one or more embodiments, detecting the energy received at the PHY includes comparing the energy to a threshold.

In one or more embodiments, the time slot is a number n of time slots, wherein the expected pattern is divided into expected pattern portions distributed within the number n of time slots, wherein comparing the pattern detected at the PHY during the time slot to the expected pattern for the time slot includes comparing received pattern portions in the number n of time slots to the expected pattern portions of the n time slots. In one or more embodiments, the number n is greater than or equal to three. In one or more embodiments, the method further includes providing an acknowledgment through the communication channel upon determining that at least one of the received pattern portions matches a corresponding expected pattern portion.

In one or more embodiments, the communication channel comprises a single twisted wire pair.

In one or more embodiments, the communication channel comprises an unshielded single twisted wire pair.

In an aspect, a method includes detecting, by a first physical layer device that is coupled to a second physical layer device via a twisted pair cable, an energy pattern on the twisted pair cable. The method further includes, prior to completion of a power mode transition of the first physical layer device in response to the detected energy pattern, transmitting a notification to a media access control unit. The method further includes signaling, by the media access control unit in response to the notification, to a third physical layer device.

In one or more embodiments, the method further includes, following the signaling of the notification, detecting a pattern on the twisted pair cable within an expected time slot, and initiating a power mode transition of the first physical layer device.

FIG. 1A is a representation of an example of communication networks in an automotive environment. In one or more embodiments, there are multiple electronics modules; one or more network nodes implemented in an electronics module; one or more electronics modules have multiple functionalities; and/or one or more electronics modules include interfaces to multiple networks. For example, in one or more embodiments, an automotive vehicle network is used to connect network nodes of various electronics modules, such as network nodes in one or more camera units (e.g., front camera 101, right camera 102, rear camera 105, left camera 106), a night vision sensor unit 103, a telematics unit 104, or a parking assist and head unit 107, as illustrated in FIG. 1A. In the example of FIG. 1A, multiple communication networks 108 connect the various nodes in the electronics modules. As would be appreciated, in one or more embodiments, automotive networking applications include various other electronics modules to facilitate control or other functionality, and in one or more embodiments, automotive networking applications include more or fewer networks 108.

Figure 1B:
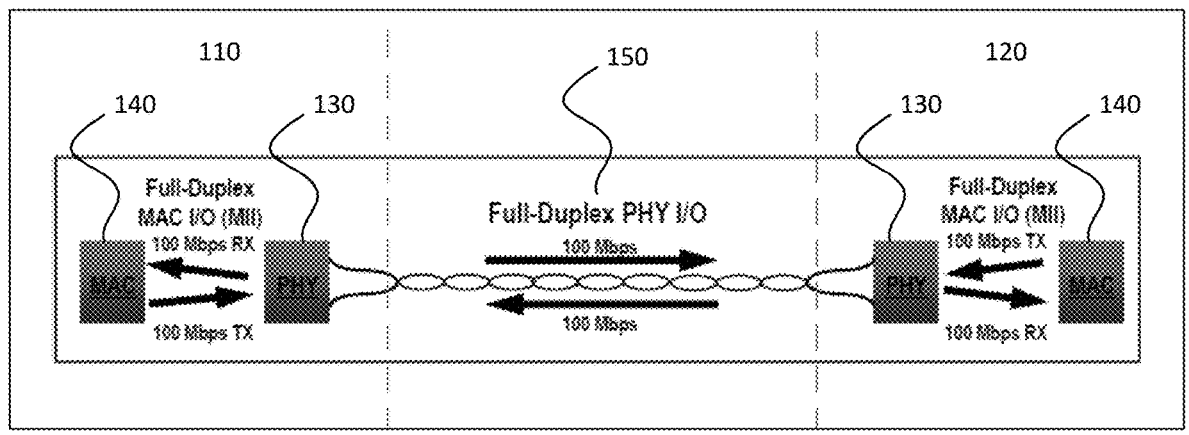
FIG. 1B is a representation of an example of a communication network.

FIG. 1B is a representation of an example of two nodes of a communication network (e.g., 108), provided for reference with respect to terminology used in this disclosure. The network in the example of FIG. 1B includes two network nodes 110 and 120. In one or more embodiments, the network nodes 110 and 120 represent one of, or a combination of, hardware, software and firmware. Additionally in the automotive network example above, in one or more embodiments, a network node is in a user device, such as smart phone, a computer, a Blu-ray disc player, and so forth. Generally, in one or more embodiments, a network node is, or is part of, a computing device, described in more detail below with respect to FIGS. 2A and 2B.

Referring still to FIG. 1B, each network node 110 and 120 includes a physical interface (PHY) 130. A PHY 130 includes hardware for making a physical connection to the network node. In wired applications, the physical connection also provides an electrical connection to the wiring between network nodes in one or more embodiments. In wireless applications, the physical connection provides an electrical connection to an antenna in one or more embodiments. PHY 130 further includes coding, implemented as one of, or a combination of, hardware, firmware, and software, in one or more embodiments. In one or more embodiments, PHY 130 includes an application-specific integrated circuit (ASIC), for example, and is implemented, for example, in a field-programmable gate array (FPGA). In one or more embodiments, an example of a PHY 130 is a Broadcom BroadR-Reach integrated circuit (IC).

PHY 130 further implements physical-layer functionality of a multi-layer software model, such as the seven-layer open systems interconnection (OSI) model, in one or more embodiments. For example, in one or more embodiments, PHY 130 implements a physical coding sublayer (PCS) and also implements a physical medium dependent (PMD) layer.

Network nodes 110, 120 further include media access control (MAC) functionality, represented by MAC 140 in FIG. 1B. MAC 140 allows for the sharing of the communication network by multiple network nodes, in one or more embodiments. In applications implementing the OSI model, MAC 140 represents the MAC sublayer in the data link layer, along with associated hardware (e.g., a MAC chip, or MAC functionality implemented on a processor of the network node or electronics module). As illustrated in FIG. 1B, in one or more embodiments, MAC 140 and PHY 130 communicate with each other in full-duplex over a physical interface of input/output (I/O) pins and corresponding traces or other connections, together referred to in FIG. 1B as MAC I/O, which is a media independent interface (MII) in one or more embodiments, as also shown in FIG. 1B. In the example shown, the MAC I/O interface is a 100 megabits per second (Mbps) interface in each direction, both transmit (TX) and receive (RX). In one or more embodiments, communication capability is greater than or less than 100 Mbps, and in one or more embodiments, the TX and RX capabilities are unequal.

The communication network of FIG. 1B further includes a full-duplex communication channel 150 in one or more embodiments. Although illustrated in FIG. 1B as being wired, channel 150 is instead wireless in one or more embodiments. In the automotive example, channel 150 is UTP in one or more embodiments. In the example shown in FIG. 1B, channel 150 is a 100 Mbps interface in each direction, both transmit (TX) and receive (RX). In one or more embodiments, channel 150 is a 100BASE-X interface (e.g., 100BASE-T or 100BASE-F/S/B/L). In one or more embodiments, communication capability is greater than or less than 100 Mbps. For example, in one or more embodiments, channel 150 is a 1000BASE-X/T/TX interface. In one or more embodiments, the TX and RX capabilities of channel 150 are unequal. Because channel 150 connects PHY 130 instances, it is referred to in FIG. 1B as PHY I/O.

Figure 2A:
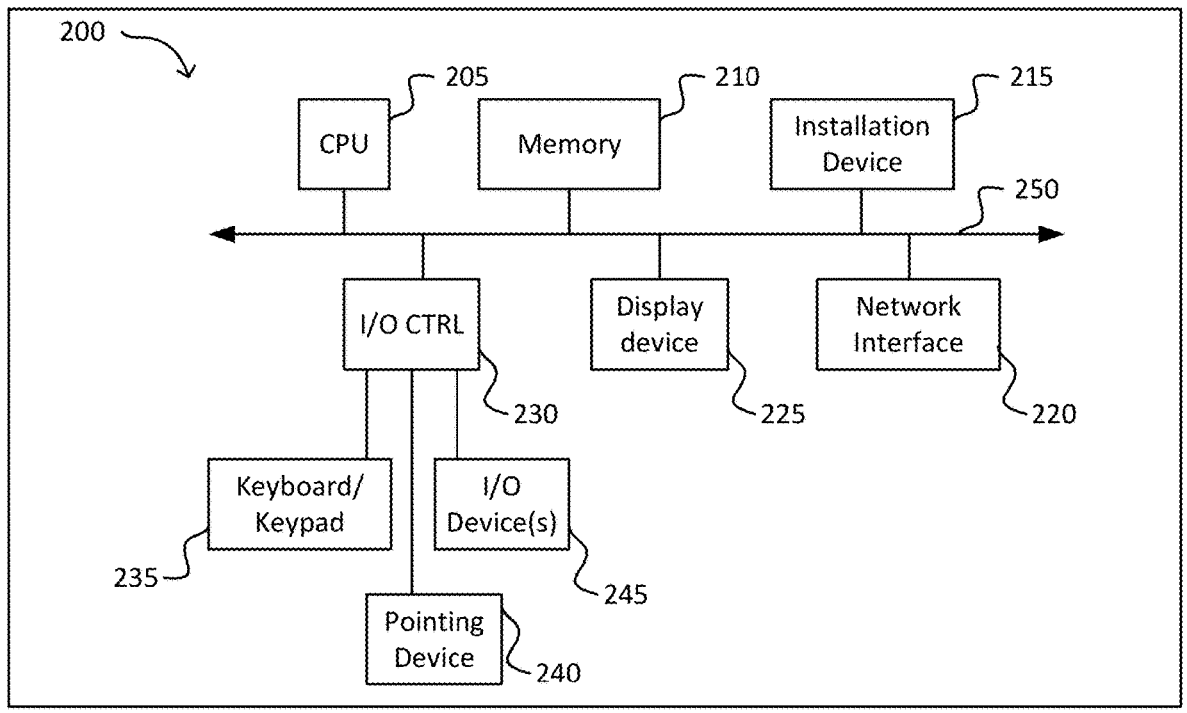
FIG. 2A is a block diagram of an example of a computing device.
Figure 2B:
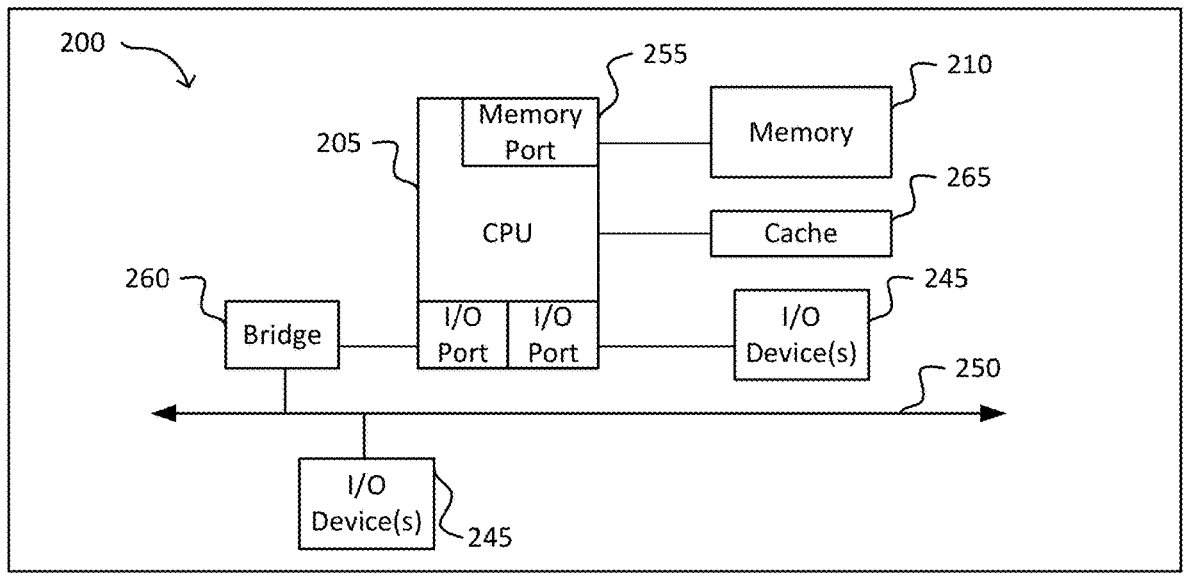
FIG. 2B is a block diagram of an example of a computing device.

As described above, a network node is, or is included as part of, a computing device. FIGS. 2A and 2B depict block diagrams of a computing device 200. As shown in FIG. 2A, computing device 200 includes a central processing unit (CPU) 205 and memory 210. As shown in FIG. 2A, in one or more embodiments, a computing device 200 includes one or more of an installation device 215, a network interface 220, a display device 225, an input/output (I/O) controller 230, a keyboard (or keypad) 235, a pointing device 240 such as a mouse, and, more generally, I/O devices 245. Components of computing device 200 communicate with each other over one or more buses 250. Memory 210 includes, for example, data, an operating system, and application software. As shown in FIG. 2B, computing device 200 includes additional optional elements in one or more embodiments, such as a memory port 255, a bridge 260, and a cache memory 265 in communication with CPU 205.

CPU 205 represents processing functionality implemented in one or more of a processor, microprocessor, microcontroller, ASIC, and/or FPGA, along with associated logic. More generally, CPU 205 is any logic circuitry that responds to and processes instructions fetched from memory 210. Examples of CPU 205 include processors manufactured by Intel Corporation of Mountain View, Calif.; International Business Machines of White Plains, N.Y.; or Advanced Micro Devices of Sunnyvale, Calif.

Memory 210 represent one or more memory devices capable of storing data and/or storing instructions (e.g., operating system and application software). Portions of memory 210 are accessed by CPU 205 through a bus, or through a direct memory access (DMA) device or function. Memory 210 include semiconductor memories such as random access memory (RAM, e.g., static RAM (SRAM), dynamic RAM (DRAM), and ferroelectric RAM (FRAM), among others), or other semiconductor devices (e.g., NAND flash, NOR flash, and solid state drives (SSD), among others). In the embodiment shown in FIG. 2A, CPU 205 communicates with memory 210 via shared bus 250. FIG. 2B depicts an embodiment of a computing device 200 in which CPU 205 communicates with memory 210 via a dedicated bus of memory port 255. In one or more embodiments, CPU 205 communicates with one or more memory 210 over a combination of dedicated and shared buses, such as a dedicated bus for instruction access, and a shared bus for data access. In one or more embodiments, one or more memory 210 is dual ported.

FIG. 2B depicts an embodiment in which CPU 205 communicates directly with cache memory 265 via a dedicated bus. In one or more embodiments, CPU 205 communicates with cache memory 265 using shared bus 250.

In the embodiment shown in FIG. 2B, CPU 205 communicates with various I/O devices 245 via shared bus 250, or through a dedicated I/O bus via an I/O port. Examples of I/O buses include a VESA VL bus, an ISA bus, an EISA bus, a MicroChannel Architecture (MCA) bus, a PCI bus, a PCI-X bus, a PCI-Express bus, or a NuBus. In one or more embodiments in which an I/O device 245 is a display device, CPU 205 uses an Advanced Graphics Port (AGP) to communicate with the display device 225.

I/O devices 245 include input devices such as keyboards, mice, trackpads, trackballs, microphones, dials, touch pads, touch screen, and drawing tablets, and output devices such as video displays and speakers. The I/O devices in one or more embodiments are controlled by an I/O controller 230 as shown in FIG. 2A. An I/O device provides storage and/or an installation medium for computing device 200 in one or more embodiments. In one or more embodiments, computing device 200 provides USB connections (not shown) to receive handheld USB storage devices such as the USB Flash Drive line of devices manufactured by Twintech Industry, Inc. of Los Alamitos, Calif.

Referring again to FIG. 2A, in one or more embodiments, computing device 200 supports a suitable installation device 215, such as a disk drive, a CD-ROM drive, a CD-R/RW drive, a DVD-ROM drive, a flash memory drive, USB device, hard-drive, a network interface, or any other device suitable for installing software and programs. Optionally, an installation device 215 is also a storage device. Additionally, the operating system and the software is run from a bootable medium in one or more embodiments.

Computing device 200 in one or more embodiments includes a network interface 220 providing one or more connections such as LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections are established using associated protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one or more embodiments, computing device 200 communicates with other computing devices via a gateway or tunneling protocol such as Secure Socket Layer (SSL) or Transport Layer Security (TLS). Network interface 220 in one or more embodiments includes a built-in network adapter, network interface card, PCMCIA network card, card bus network adapter, wireless network adapter, USB network adapter, modem or other device suitable for interfacing computing device 200 to a network capable of communication and performing the operations described herein.

In one or more embodiments, computing device 200 includes or is connected to one or more display devices 225. As such, any of I/O devices 245 and/or I/O controller 230 includes suitable hardware, software, or combination of hardware and software to support, enable or provide for the connection and use of display device(s) 225 by computing device 200. For example, in one or more embodiments, computing device 200 includes a video adapter, video card, driver, and/or library to interface, communicate, connect or otherwise use display device(s) 225. In one or more embodiments, a video adapter includes multiple connectors to interface to display device(s) 225. In one or more embodiments, computing device 200 includes multiple video adapters, with each video adapter connected to display device(s) 225. In one or more embodiments, computing device 200 communicates with multiple displays 225. One ordinarily skilled in the art will recognize and appreciate the various ways and embodiments that a computing device 200 connects to, includes, and/or controls one or more display devices 225.

In one or more embodiments, bridge 260 provides a connection between the shared bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 200 of the sort depicted in FIGS. 2A and 2B operates under the control of an operating system in one or more embodiments, which controls scheduling of tasks and access to system resources. Examples of operating systems include versions of the MICROSOFT WINDOWS operating systems, the different releases of the Unix and Linux operating systems, versions of the MAC OS for Macintosh computers, an embedded operating system, a real-time operating system, an open source operating system, a proprietary operating system, an operating systems for mobile computing devices, or other operating system capable of executing on computing device 200 and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

A computing device 200 is, for example, a workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In the automotive network environment as illustrated in FIG. 1A, one or more electronics modules (e.g., front camera 101, right camera 102, rear camera 105, left camera 106, night vision sensor unit 103, telematics unit 104, parking assist and head unit 107) are also computing devices 200. Computing device 200 has sufficient processor power and memory capacity to perform the operations described herein.

Figure 3:
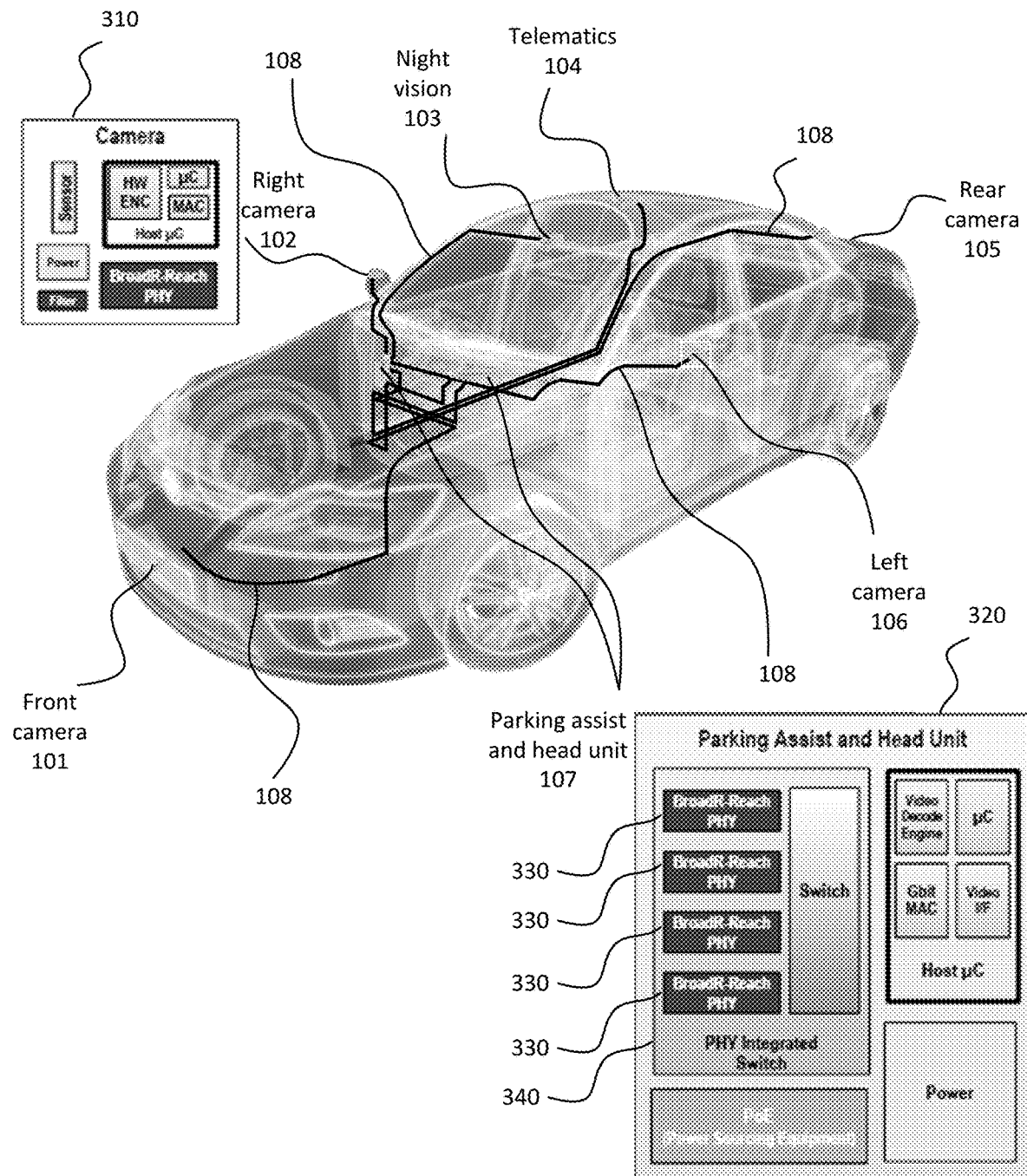
FIG. 3 is a representation of an example of an automotive communication network.

FIG. 3 illustrates an example of the communication networks of FIG. 1A implemented with Ethernet links between Ethernet network nodes according to one or more embodiments of the present disclosure. In FIG. 3, block diagram 310 illustrates circuitry and/or functionality of right camera 102, and block diagram 320 illustrates circuitry and/or functionality of parking assist and head unit 107. In one or more embodiments, a single twisted wire pair (e.g., UTP) is used to connect BroadR-Reach PHYs in the electronics modules. An advantage of such a single twisted wire pair PHY is that it leverages Ethernet technology that is already proven in IEEE-standard BASE-T PHYs. For example, a standard MAC MII is used in one or more embodiments, with PHY/media independency.

As illustrated in FIG. 3, in one or more embodiments, multiple PHYs 330 are implemented within one electronics module. For example, parking assist and head unit 310 is illustrated as including four switched PHYs 330 in a PHY integrated switch 340, although a different number of switch PHYs 330 is possible in one or more embodiments. Multiple PHYs 330 in one switch (e.g., integrated switch 340) represent parallel PHYs 150 of one network node in one or more embodiments, or singular or parallel configurations of PHYs 150 of more than one network node in one or more embodiments. The four PHYs 330 of integrated switch 340 represent four network nodes, which are connected, for example, to ones of right camera 102, left camera 106, front camera 101, and rear camera 105, night vision 103, and telematics 104 electronics modules in one or more embodiments. The four network nodes of the parking assist and head unit 107 in this example represent one or more communication network; for example, right camera 102, left camera 106, front camera 101, and rear camera 105 are each in a separate network in one or more embodiments, or two or more are part of one network in one or more embodiments. Thus, for the example of implementing Ethernet in an automotive environment, there are multiple Ethernet networks within the same vehicle in one or more embodiments.

Figure 4:
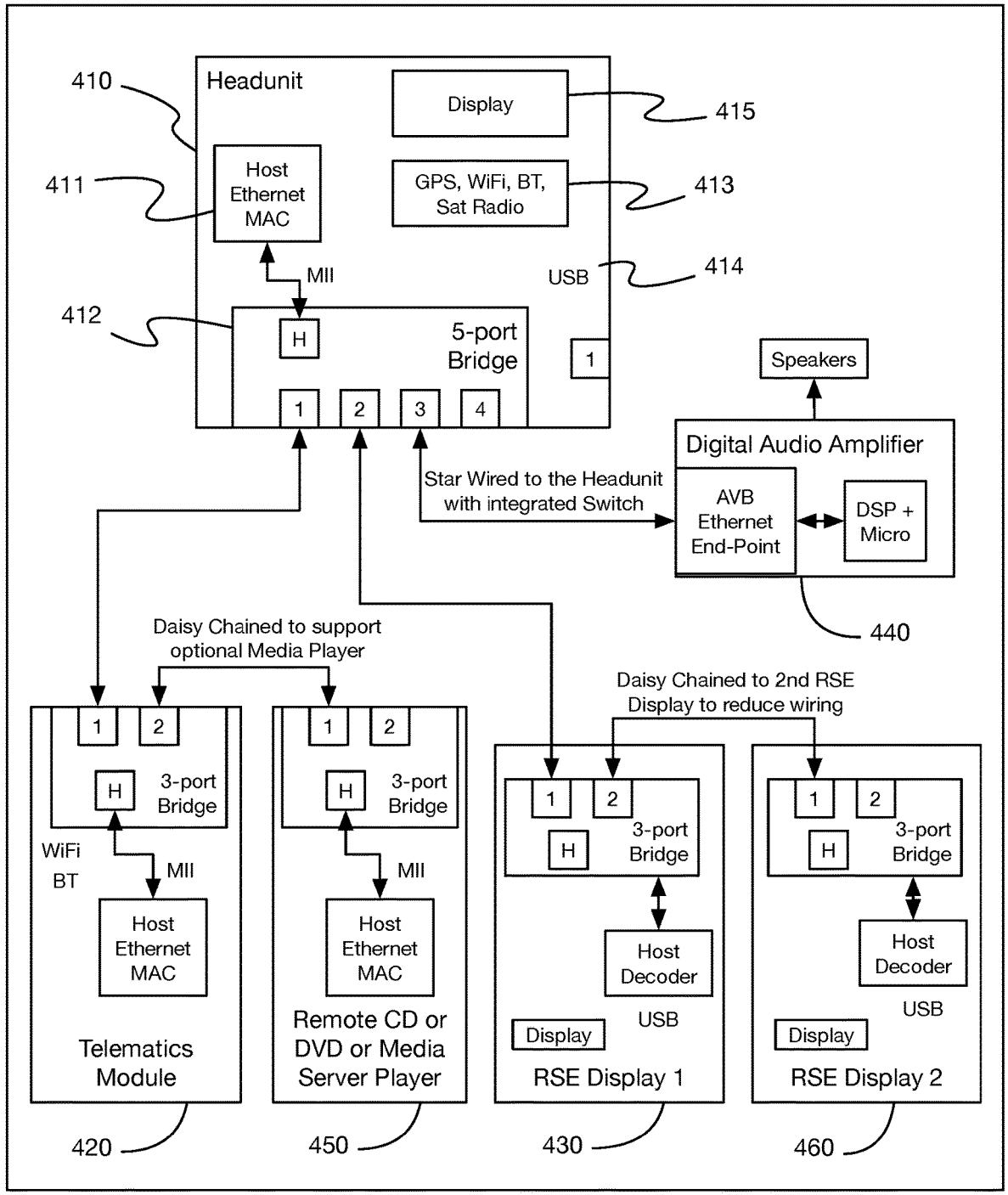
FIG. 4 is a representation of another automotive communication network.

FIG. 4 illustrates another example of an Ethernet implementation in an automotive environment. In this example, an entertainment headunit 410 electronics module is a computing device 200 with multiple network nodes. Headunit 410 includes an Ethernet MAC on a host 411 in one or more embodiments, where the term host refers in this example to a processor in headunit 410. The multiple network nodes in this example are implemented using an integrated five-port bridge 412, where one port is connected to the host 411, three ports are connected to other network nodes in other electronics modules, and one port is not used. Headunit 410 further includes, in one or more embodiments, a block 413 representing wireless communication network interfaces, an icon 414 indicating a wired or wireless universal serial bus (USB) connection, and a connected display 415. In the example of FIG. 4, port 1 of bridge 412 is connected to a corresponding port (port 1 of a 3-port bridge) of a network node in telematics module 420, port 2 of bridge 412 is connected to a corresponding port (port 1 of a 3-port bridge) of a network node in an RSE display 430 electronics module, and port 3 of bridge 412 is connected to a corresponding network node in a digital audio amplifier 440 electronics module. As shown in FIG. 4, daisy chaining is used, for example, to extend the network or to reduce wiring in the wiring harnesses in one or more embodiments. In the example of FIG. 4, telematics module 420 is daisy chained, e.g., to allow for extension to an optional media device 450, and RSE display 430 is daisy-chained to a second RSE display 460, e.g., to reduce wiring.

In the example of FIG. 4, in one or more embodiments, if no RSE is presently in use, then RSE displays 430, 460 are transitioned to a reduced-power mode, and it is possible that digital audio amplifier 440 is also transitioned to a reduced-power mode. However, if digital audio amplifier 440 is transitioned to a reduced-power mode, and subsequently telematics module 420 is turned on and provides, for example, turn-by-turn directions for audible presentation by digital audio amplifier 440, digital audio amplifier 440 is transitioned to an increased-power mode in anticipation.

More generally, in one or more embodiments, network nodes are transitioned between power modes so that functionality is available when requested, but reduced amounts of power consumed when not requested. Capability for multiple power modes is implemented using hardware, software, firmware, or a combination thereof. As described above, power modes are implemented for portions of, or all of, an electronics module; for example, in one or more embodiments, an electronics module has one power scheme related to the electronics module, and additional or alternative power schemes related to individual functions of the electronics module. Thus, in one or more embodiments, a network node is transitioned to a reduced-power mode, while the remainder of the electronics module containing the network node is retained in a different power mode.

When transitioning power modes of multiple network nodes (e.g., by request, at the occurrence of an event, periodically, etc.), the power modes of the network nodes in one or more embodiments are transitioned sequentially; while in one or more embodiments, the power modes of the network nodes are transitioned substantially concurrently. The term "substantially" in this context describes and accounts for small variations, referring to instances in which the event or circumstance occurs precisely as well as instances in which the event or circumstance occurs to a close approximation. In one or more embodiments, a sequential technique has a duration equal to a sum of time for individual network nodes to complete a transition to an increased-power mode; whereas, in one or more embodiments, a concurrent technique has a duration equal to the time for an individual network node to transition to an increased-power mode. For example, the duration of a concurrent technique in one or more embodiments is equal to the time for a primary network node to complete transitioning power modes. For another example, the duration of a concurrent technique in one or more embodiments is equal to the time for a last primary network node to complete transitioning power modes.

The present disclosure describes a concurrent technique for transitioning power modes of a group of network nodes.

Referring to FIG. 1B, a PHY 130 determines that it is time for its corresponding network node to transition from a reduced-power mode to an increased-power mode, such as, in one or more embodiments, upon a powering up, in response to a hardware or software interrupt, upon receipt of a signal on the communication channel (e.g., channel 150 in FIG. 1B), at the expiration of a timer, or at the occurrence of an event. In one or more embodiments, when a PHY 130 determines that it is time for its corresponding network node to transition from a reduced-power mode to an increased-power mode, the PHY 130 provides an indication to PHYs 130 in other network nodes that a power mode transition is beginning. Thus, while the PHY 130 is initiating a power mode transition within its own network node, the PHYs 130 in the network initiate concurrent power mode transitions within their own network nodes.

In one or more embodiments, a PHY 130 indicates to other PHYs 130 that it is transitioning power state by sending a defined MII message to its associated MAC 140 (such as, for example, the MAC implemented in host 411 in FIG. 4). In one or more embodiments, a defined MII message is sent to the associated MAC 140 by way of sending the defined MII message through a switch (e.g., such as switch 340 between the MAC in the host and the four PHYs 330 in FIG. 3). The associated receiving MAC 140 responds to receipt of the defined MII message by initiating a defined power-mode-transition signaling sequence through the PHY 130 to PHYs 130 in other network nodes. Because the MAC 140 is notified when its PHY 130 identifies that a power mode transition is beginning, the MAC 140 is able to signal the other network nodes to begin a power mode transition also, without waiting until its own PHY 130 completes the power mode transition. This parallel mechanism provides for additional power mode transition time budget for the individual network nodes.

A version of the present MII message definitions is shown in Table 1 (for receive, RX) and Table 2 (for transmit, TX), by way of non-limiting illustration.

TABLE 1

| RX_DV | RX_ER | RXD <3:0> | Indication |
|---|---|---|---|
| 0 | 0 | 0000 through 1111 | Normal inter-frame message |
| 0 | 1 | 0000 | Normal inter-frame message |
| 0 | 1 | 0001 through 1101 | Reserved |
| 0 | 1 | 1110 | False carrier indication |
| 0 | 1 | 1111 | Reserved |
| 1 | 0 | 0000 through 1111 | Normal data reception |
| 1 | 1 | 0000 through 1111 | Data reception with errors |

TABLE 2

| TX_EN | TX_ER | TXD <3:0> | Indication |
|---|---|---|---|
| 0 | 0 | 0000 through 1111 | Normal inter-frame message |
| 0 | 1 | 0000 through 1111 | Reserved |
| 1 | 0 | 0000 through 1111 | Normal data transmission |
| 1 | 1 | 0000 through 1111 | Transmit error propagation |

In one or more embodiments, the predefined MII message received by a MAC 140 from a PHY 130 indicating that a power mode transition is beginning is assigned to one of the combinations not used, marked as "Reserved" in Table 1 above. For example, one of the combinations RX_DV=0, RX_ER=0, RXD<3:0>=[one of 0001 through 1101] is used in one or more embodiments. Table 3 excerpts this row from Table 1, by way of illustration.

TABLE 3

| RX_DV | RX_ER | RXD <3:0> | Indication |
|-------|-------|-----------|------------|
| 0 | 1 | 0001 through 1101 | Reserved |

By way of illustration and not limitation, the predefined MII message received by the MAC 140 from the PHY 130 indicating that a power mode transition is beginning is RX_DV=0, RX_ER=1, RXD<3:0>=0010, one of the messages shown as "Reserved" in Tables 1 and 3.

As discussed above, the MAC 140 responds to receipt of the defined MII message by initiating a defined power-mode-transition signaling sequence through the associated PHY 130 to PHYs 130 in other network nodes. In one or more embodiments, the defined power-mode-transition signaling sequence is the wake-up message sequence (i.e., TX_EN=0, TX_ER=1→0, TXD<3:0>=0001→0000). In one or more embodiments, the defined power-mode-transition signaling sequence is another sequence.

In an electrically noisy environment, if the defined power-mode-transition signaling sequence is a message or other sequence sent one time, it is possible that the defined power-mode-transition signaling sequence could get lost in the electrical noise, or that a false detection of a defined power-mode-transition signaling sequence could occur. For such electrically noisy environments, the defined power-mode-transition signaling sequence incorporates a handshaking protocol in one or more embodiments, where a PHY 130 looks for portions of the defined power-mode-transition signaling sequence over multiple predefined time slots, and provides an acknowledgment that the defined power-mode-transition signaling sequence was received.

As noted above, in one or more embodiments, the MAC 140 initiates a defined power-mode-transition signaling sequence through the PHY 130 to PHYs 130 in other network nodes. For embodiments in which the defined power-mode-transition signaling sequence incorporates a handshaking protocol, in one or more embodiments the MAC 140 is in control of the portions of the defined power-mode-transition signaling sequence sent in each of the multiple predefined time slots. Alternatively, in one or more embodiments, once the defined power-mode-transition signaling sequence is initiated by the MAC 140, the PHY 130 is in control of the portions of the defined power-mode-transition signaling sequence sent in each of the multiple predefined time slots. In one or more embodiments, rather than the MAC 140 initiating a defined power-mode-transition signaling sequence through the PHY 130 to PHYs 130 in other network nodes, a PHY 130 initiates the defined power-mode-transition signaling sequence itself, either before or after notifying the MAC 140 that a power mode transition is beginning.

The PHYs 130 to which the defined power-mode-transition signaling sequence is directed monitor the channel (e.g., channel 150) for activity in one or more embodiments, and thereby detect initiation of a defined power-mode-transition signaling sequence. Monitoring the channel for activity is passive energy detection in one or more embodiments, such as in the case in which energy, or an integration of energy, exceeds a threshold and causes a trigger or interrupt to occur. Monitoring the channel for activity is active detection in one or more embodiments, such as periodically transitioning from a reduced-power mode to an increased-power mode to check for messages in the channel.

In one or more embodiments, a multi-stage detection scheme is used within the PHYs 130. For example, in one or more embodiments, a PHY 130 is kept in a reduced-power mode while not in use, and in the reduced-power mode, the PHY 130 uses passive energy detection to identify a potential start of a defined power-mode-transition signaling sequence; if a potential start is identified, the PHY 130 then uses active detection to verify either that a defined power-mode-transition signaling sequence is indeed occurring, or to determine that no defined power-mode-transition signaling sequence is occurring, in which case the PHY 130 returns to passive energy detection for monitoring the channel in one or more embodiments. In one or more embodiments, the multi-stage detection scheme is three or more stages. The additional stages include, in one or more embodiments, a pre-warn stage in which the PHY 130 has detected portions of the defined power-mode-transition signaling sequence in two or more of the predefined multiple time slots and provides a notification to its MAC 140 that a power mode transition is imminent. Another example of additional stages in one or more embodiments is the implementation of incremental power mode transitions in subsequent stages (e.g., the PHY 130 transitions from a first power mode at a first stage to a second power mode at a second stage to a third power mode at a third stage) as the probability increases that an actual defined power-mode-transition signaling sequence is occurring.

When a receiving PHY 130 determines that an actual defined power-mode-transition signaling sequence has completed, the PHY 130 transitions to a fully operational power mode in one or more embodiments.

Figure 5:
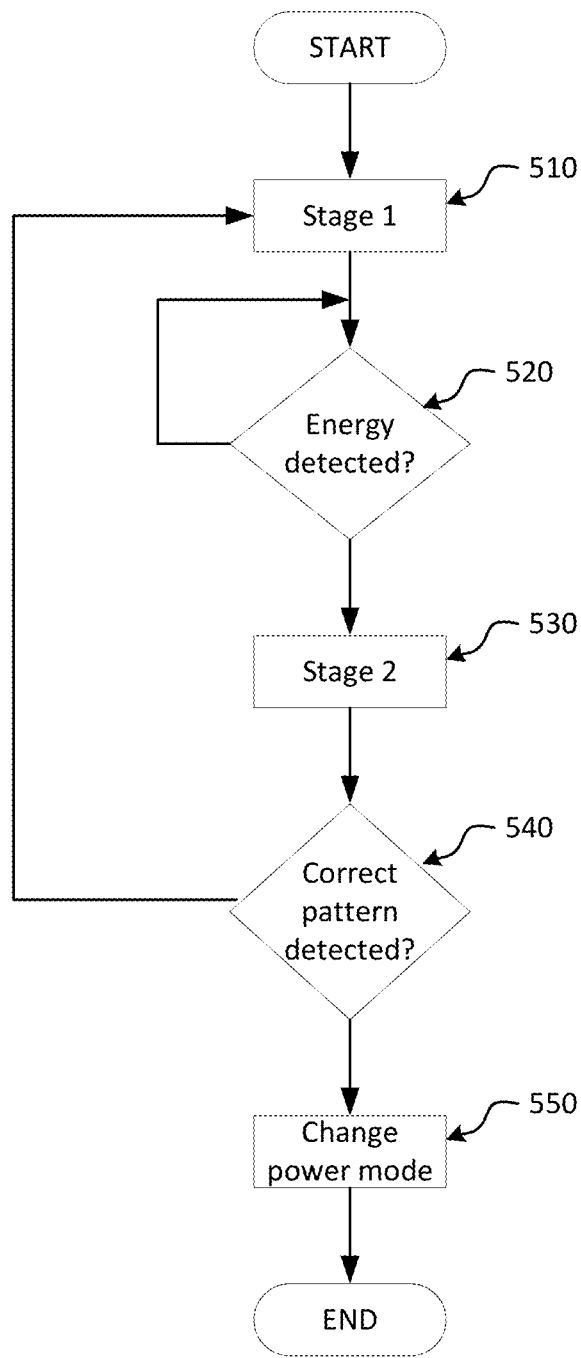
FIG. 5 is a diagram representing a two-stage energy detection technique.

FIG. 5 illustrates an example embodiment of a multi-stage energy detection in the form of a two-stage energy detection. In this two-stage energy detection example, passive energy detection is used during the first stage (for example, to satisfy 10 μA power consumption requirements), and active detection is used in the second stage. In this example, the active detection is pattern-based detection. When not in use, the PHY 130 is in stage 1 (at 510). Upon energy detection (at 520) in the first stage, a pattern detector is powered on for use in the second stage (at 530). Upon correct pattern detection (at 540) in the second stage, the PHY 130 transitions to an increased-power mode (at 550). If a correct pattern is not detected (at 540) in the second stage, a determination is made that no defined power-mode-transition signaling sequence is occurring, and the PHY 130 returns to the first stage (to 510).

In embodiments in which multi-stage detection is implemented and a PHY 130 includes a capability for passive energy detection (e.g., the two-stage detection described by FIG. 5), in one or more embodiments there are other PHYs 130 in the network with pattern detection but without passive energy detection. For such a network, an initiating part of the defined power-mode-transition signaling sequence is a pattern in one or more embodiments, which is detected as energy by the passive energy detection in one or more embodiments and recognized as a pattern by the pattern detector in one or more embodiments. Alternatively, in one or more embodiments, the initial part of the defined power-mode-transition signaling sequence is random energy, which is detected by the passive energy detection and ignored by the pattern detector.

Figure 6:
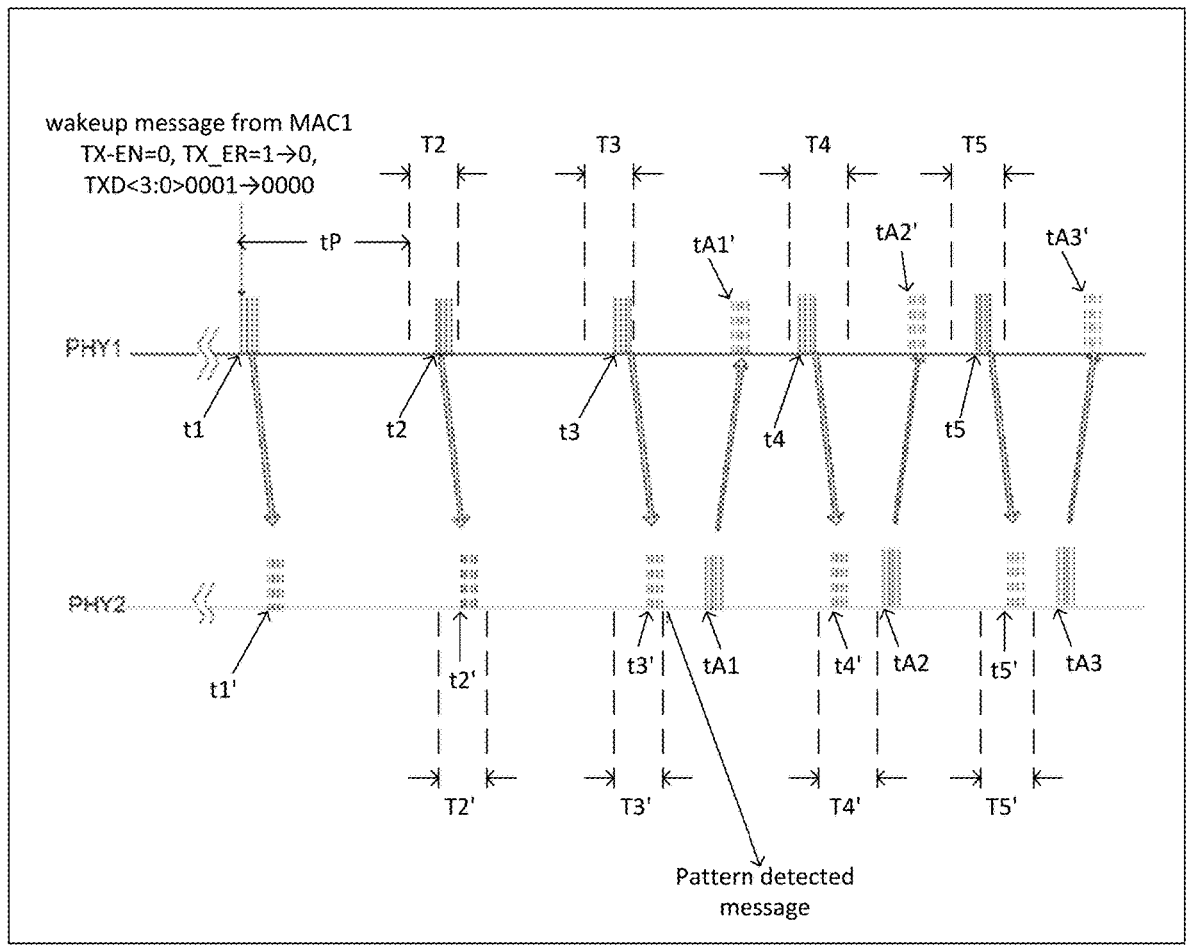
FIG. 6 is a timing diagram for an example of a power-mode-transition signaling sequence.

FIG. 6 illustrates an example of a defined power-mode-transition signaling sequence. In one or more embodiments, the defined power-mode-transition signaling sequence incorporates a handshaking protocol between an initiating network node and a receiving network node according to this disclosure. In the example of FIG. 6, an initiating network node includes PHY1 and MAC1, and a receiving node includes PHY2 and MAC2. In this example, MAC1 initiates the defined power-mode-transition signaling sequence and PHY1 is in control of the portions of the defined power-mode-transition signaling sequence sent in each of the multiple predefined time slots. At a time t1, after PHY1 has notified MAC1 that PHY1 is beginning a power mode transition, MAC1 initiates the defined power-mode-transition signaling sequence by sending a first portion of the defined power-mode-transition signaling sequence through PHY1 to PHY2. In the example of FIG. 6, the first portion sent at time t1 is a wakeup message (e.g., TX_EN=0, TX_ER=1→0, TXD<3:0>=0001→0000). PHY2 receives the wakeup message at time t1', which is subsequent to time t1 by an amount approximately equal to the propagation delay between PHY1 and PHY2. The handshaking protocol in this example defines that a second portion of the defined power-mode-transition signaling sequence is to be sent within a time slot T2 (e.g., a time slot that begins a predefined time tP after t1), and correspondingly, PHY1 sends the second portion at time t2 within time slot T2. The second portion is received by PHY2 at time t2' within an expected time slot T2'. The handshaking protocol in this example defines that a third portion of the defined power-mode-transition signaling sequence is to be sent within a time slot T3, and correspondingly, PHY1 sends the third portion at time t3 within time slot T3, which is received by PHY2 at time t3' within an expected time slot T3'. After verifying that the received first, second and third portions met the predefined descriptions for the first, second and third portions, and that the received portions were received within the respective expected time slots, PHY2 determines that an actual defined power-mode-transition signaling sequence has been received, and notifies MAC2 (i.e., the MAC associated with PHY2). In the example of FIG. 6, PHY2 notifies MAC2 by sending MAC2 a pattern detected message.

In the example of FIG. 6, the handshaking protocol continues at time tA1, when PHY2 acknowledges (itself, or under the control of MAC2) to PHY1 that a defined power-mode-transition signaling sequence has been received. PHY1 receives the acknowledgment at time tA1'. The handshaking protocol in the example of FIG. 6 continues after the acknowledgment by PHY2. In the example of FIG. 6, remaining portions of the defined power-mode-transition signaling sequence are sent from PHY1 at time t4 within a time slot T4 (received by PHY2 at time t4' within an expected time slot T4', and acknowledged at time tA2), and at time t5 within a time slot T5 (received by PHY2 at time t5' within an expected time slot T5', and acknowledged at time tA3).

In one or more embodiments, the time slots T2, T3, T4, T5 and respective corresponding expected time slots T2', T3', T4', T5' have the same duration, and in one or more embodiments, the durations are unequal. In one or more embodiments, the time difference between the end of one time slot and the beginning of the next time slot (e.g., the time between the end of time slot T2 and the beginning of time slot T3, the time between the end of time slot T3 and the beginning of time slot T4, and the time between the end of time slot T4 and the beginning of time slot T5) is the same between each two subsequent time slots; in one or more embodiments, the time differences are unequal. In the example of FIG. 6, the defined power-mode-transition signaling sequence is divided into five portions, sent at times t1, t2, t3, t4 and t5. In one or more embodiments, the defined power-mode-transition signaling sequence is divided into two, three or four portions, for example, or divided into six or more portions, and the number of portions is sent within the time slot scheme defined for the specific embodiment. In one or more embodiments, each portion of the defined power-mode-transition signaling sequence is equivalent (e.g., the same message sent at each time slot), and in one or more embodiments, one or more portion(s) of the defined power-mode-transition signaling sequence is/are different than the other portions. In one or more embodiments, one or more portion(s) of the defined power-mode-transition signaling sequence is/are an Ethernet message, and in one or more embodiments, one or more portion(s) of the defined power-mode-transition signaling sequence is/are not an Ethernet message.

In one or more embodiments, PHY2 transition to a reduced-power mode if the defined power-mode-transition signaling sequence is not received within a predefined time after t1', or if the expected portions of the power-mode-transition signaling sequence are not received at one or more of T2', T3', T4, or T5'.

As can be seen from the example described with respect to FIG. 6, there is substantial flexibility to design a defined power-mode-transition signaling sequence with handshaking protocol to adapt to an amount of electrical noise in the environment of the network.

Thus has been described techniques allowing for reducing power consumption while maintaining response time, by transitioning network nodes to higher power modes in a parallel fashion.

As used herein, the terms "substantial," "substantially" and "about" are used to describe and account for small variations. When used in conjunction with an event or circumstance, the terms refer to instances in which the event or circumstance occurs precisely as well as instances in which the event or circumstance occurs to a close approximation. For example, the terms refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While the disclosure has been described with reference to the specific embodiments thereof, it should be understood by those skilled in the art that various changes can be made and equivalents substituted without departing from the true spirit and scope of the disclosure as defined by the appended claims. In addition, many modifications can be made to adapt a particular situation, material, composition of matter, method, operation or operations, to the objective, spirit and scope of the disclosure. All such modifications are intended to be within the scope of the claims appended hereto. In particular, while certain methods have been described with reference to particular operations performed in a particular order, it will be understood that these operations can be combined, sub-divided, or re-ordered to form an equivalent method without departing from the teachings of the disclosure. Accordingly, unless specifically indicated herein, the order and grouping of the operations is not a limitation of the disclosure.

We claim:

1. A device comprising:
    an interface configured for connection to a communication channel; and
    circuitry configured to:
        identify, in a passive energy detection stage, a start of a defined power-mode-transition signaling sequence using passive energy detection while the device is in a reduced-power mode, wherein the passive energy detection comprises detecting that energy received at the interface exceeds a threshold;
        determine, in an active energy detection stage, responsive to the start of the defined power-mode-transition signaling sequence being identified, that the defined power-mode-transition signaling sequence is occurring using active energy detection, wherein the active energy detection comprises periodically transitioning the device from the reduced-power mode to an increased-power mode to check messages in the communication channel; and
        transition the device to an operational power mode responsive to a determination that the defined power-mode-transition signaling sequence has completed.

2. The device of claim 1, wherein the defined power-mode-transition signaling sequence comprises a plurality of portions, and
    wherein the circuitry is further configured to:
        detect, in a pre-warn stage, two or more portions of the plurality of portions of the defined power-mode-transition signaling sequence in two or more of a plurality of predetermined time slots; and
        provide, in the pre-warn stage, a notification that a power mode transition is imminent responsive to detecting the two or more portions of the defined power-mode-transition signaling sequence in the two or more of the plurality of predetermined time slots.

3. The device of claim 2, wherein the plurality of portions of the defined power-mode-transition signaling sequence include at least three portions, and the plurality of predetermined time slots include at least three time slots.

4. The device of claim 3, wherein each portion of the plurality of portions of the defined power-mode-transition signaling sequence is equivalent to each other.

5. The device of claim 3, wherein at least one portion of the plurality of portions of the defined power-mode-transition signaling sequence is different from other portions of the plurality of portions of the defined power-mode-transition signaling sequence.

6. The device of claim 1, wherein the circuitry is further configured to perform at least two additional stages of detection prior to transitioning the device into the operational power mode, and wherein the device transitions from a first additional stage to a second additional stage with an incremental power mode transition as a probability that the defined power-mode-transition signaling sequence is occurring increases.

7. A system comprising:
    a first network node comprising a first media access controller (MAC) and a first physical interface device (PHY); and
    a second network node comprising:
        a second MAC; and
        a second PHY configured to transmit, to the second MAC, a defined media independent interface (MII) message indicating that a power mode transition is beginning,
        wherein the second MAC is configured to initiate, responsive to receiving the defined MII message from the second PHY, a defined power-mode-transition signaling sequence through the second PHY to the first PHY in the first network node to signal the first network node to begin the power mode transition, and
        wherein the defined power-mode-transition signaling sequence comprises a plurality of portions, and each portion is transmitted from the second PHY of the second network node to the first PHY of the first network node in a respective time slot of a plurality of predetermined time slots.

8. The system of claim 7, wherein the first PHY of the first network node is configured to:
    determine that the defined power-mode-transition signaling sequence has been received by verifying that each portion of the plurality of portions of the defined power-mode-transition signaling sequence satisfies a respective predetermined description for the each portion of the plurality of portions and that each portion of the plurality of portions of the defined power-mode-transition signaling sequence is received within the respective time slot of the plurality of predetermined time slots; and
    responsive to determining that the defined power-mode-transition signaling sequence has been received, notify the first MAC of the first network by sending a pattern detected message.

9. The system of claim 7, wherein the first network node is a telematics module in a vehicle, and the second network node is an audio module in the vehicle.

10. The system of claim 7, wherein the first network node and the second network node are network nodes in a vehicle, and wherein the first MAC is a first host Ethernet MAC in the first network node in the vehicle, and the second MAC is a second host Ethernet MAC in the second network node in the vehicle.

11. The system of claim 7, wherein the first network node and the second network node are network nodes in a vehicle, and wherein the first PHY comprises a first multi-port bridge in the first network node in the vehicle, and the second PHY comprises a second multi-port bridge in the second network node in the vehicle.

12. The system of claim 11, wherein a first port of the first multi-port bridge in the first network node in the vehicle is connected to the first MAC, and a second port of the first multi-port bridge is connected to a first port of the second multi-port bridge in the second network node in the vehicle.

13. The system of claim 12, wherein the second port of the first multi-port bridge in the first network node in the vehicle is connected to the first port of the second multi-port bridge in the second network node in the vehicle using daisy chaining.

14. The system of claim 7, wherein the second PHY transmits the defined MII message indicating that the power mode transition is beginning to the second MAC via an integrated switch in a vehicle.

15. The system of claim 7, wherein the plurality of portions of the defined power-mode-transition signaling sequence include at least three portions, and the plurality of predetermined time slots include at least three time slots.

16. The system of claim 7, wherein each portion of the plurality of portions of the defined power-mode-transition signaling sequence is equivalent to each other.

17. The system of claim 7, wherein at least one portion of the plurality of portions of the defined power-mode-transition signaling sequence is different from other portions of the plurality of portions of the defined power-mode-transition signaling sequence.

18. An apparatus comprising:
a media access controller (MAC); and
a physical interface device (PHY) configured to:
  receive a plurality of portions of a defined power-mode-transition signaling sequence via a communication channel from another PHY of another device, wherein each portion of the plurality of portions of the defined power-mode-transition signaling sequence is transmitted from the another PHY in a respective time slot of a plurality of predetermined time slots;
  perform a first verification that each portion of the plurality of portions of the defined power-mode-transition signaling sequence satisfies a respective predetermined description for the portion of the plurality of portions of the defined power-mode-transition signaling sequence;
  perform a second verification that each portion of the plurality of portions of the defined power-mode-transition signaling sequence is received within a respective time slot of a plurality of predetermined time slots;
  determine that the defined power-mode-transition signaling sequence has been received based on the first verification and the second verification; and
  responsive to determining that the defined power-mode-transition signaling sequence has been received, notify the MAC by sending a pattern detected message.

19. The apparatus of claim 18, wherein the plurality of portions of the defined power-mode-transition signaling sequence include at least three portions, and the plurality of predetermined time slots include at least three time slots, and wherein each portion of the defined power-mode-transition signaling sequence is equivalent to each other.

20. The apparatus of claim 18, wherein the plurality of portions of the defined power-mode-transition signaling sequence include at least three portions, and the plurality of predetermined time slots include at least three time slots, and wherein at least one portion of the defined power-mode-transition signaling sequence is different from other portions of the defined power-mode-transition signaling sequence.

* * * * *